United States Patent

[11] 3,628,871

[72] Inventor Anders B. Himmelstrup
 2368 Bourne Ave., St. Paul, Minn. 55108
[21] Appl. No. 863,859
[22] Filed Oct. 6, 1969
[45] Patented Dec. 21, 1971

[54] OPTICAL COLOR PRINTING ANALYSIS DEVICE AND METHOD
14 Claims, 3 Drawing Figs.

[52] U.S. Cl. .................................................. 356/189,
 101/171, 356/256, 350/196, 350/235, 35/28.3,
 96/118
[51] Int. Cl. ..................................................... G01j 3/48,
 B41f 15/00
[50] Field of Search ........................................ 356/173–191,
 256; 350/196, 235; 35/28.3;
 101/171; 96/118

[56] References Cited
UNITED STATES PATENTS
2,404,888 7/1946 Richards ..................... 350/196 X
2,748,474 6/1956 Brown .......................... 350/196 X
FOREIGN PATENTS
1,011,060 6/1952 France ......................... 356/189
OTHER REFERENCES The Lithographer's Manual, Vol. 1, Waltwin Pub. Co. (New York) 1958, pp. 8822–8825

"New B & L Illuminated Magnifier," Am. J. of Optometry and Archives of Am. Acad. of Optometry 37, (8), Aug. 1960, pp. 439–440

Reed, "Instruments for Quality Control in Lithography," Lithographic Techn. Foundation Inc. (New York) 1963, pp. 65–67.

*Primary Examiner*—Ronald L. Wibert
*Assistant Examiner*—R. J. Webster
*Attorneys*—Frederick E. Lange and William C. Babcock

ABSTRACT: An optical magnifying lens is mounted as part of a manually portable color printing analysis device which has support means adapted to position the lens properly above a color print surface to be inspected. A light on the device illuminates the surface, and a color filter is mounted for selective movement into the field between the lens and surface. The filter color is complementary to the color of that part of the surface to be checked. For example, a blue filter is provided for inspection of yellow printed surfaces. Preferably one or more such color filters are mounted on a filter plate movably supported on a body portion of the device, which body portion also serves as a handle and battery case. Inspection of the surface through the magnifying lens and filter provides an enlarged dark contrast image of the desired color printed areas, such as the colored dot portion of a colored halftone sheet, even though some of the colors to be inspected are partially overprinted by other colors.

PATENTED DEC 21 1971  3,628,871
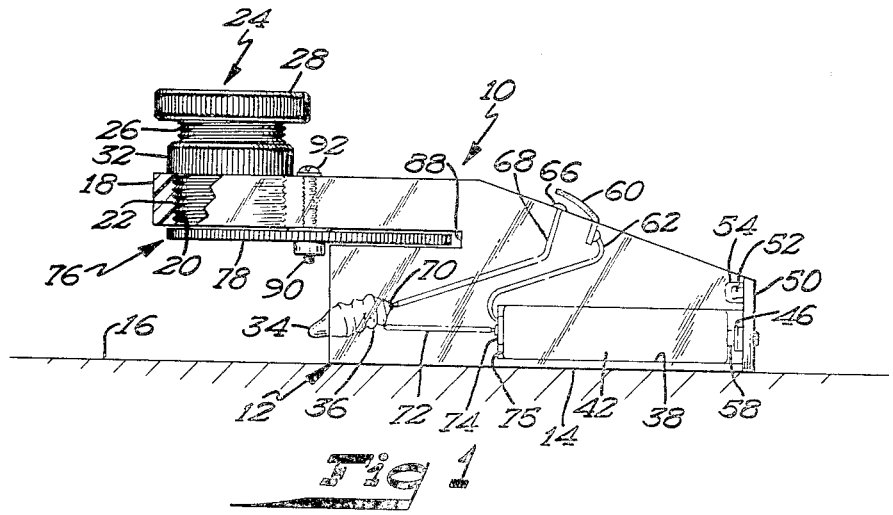
Fig 1
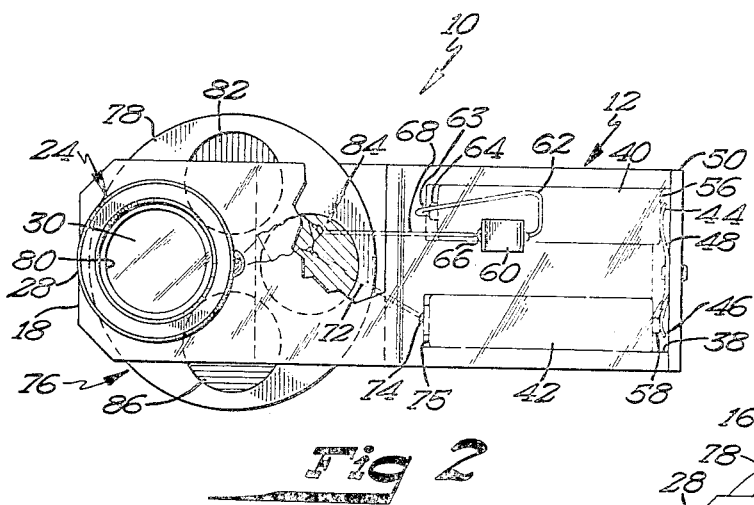
Fig 2
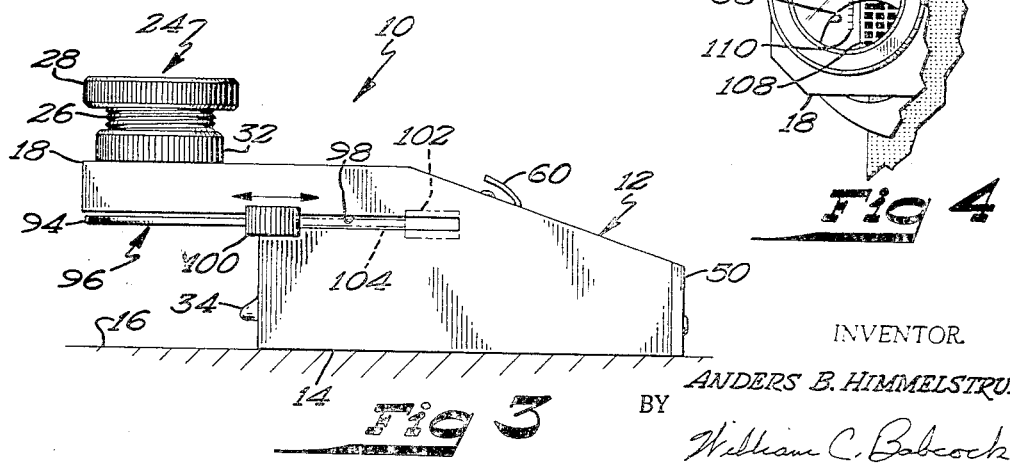
Fig 3
Fig 4
INVENTOR.
ANDERS B. HIMMELSTRUP
BY
William C. Babcock
ATTORNEY

3,628,871

OPTICAL COLOR PRINTING ANALYSIS DEVICE AND METHOD

BACKGROUND OF THE INVENTION

In the printing of color reproductions, the quality of color reproductions is substantially dependent on the particular dot structure of each printed color which comes off the press. The lighting in press rooms is often inadequate for close analysis of the printed sheet. Moreover, with certain colors, for example a yellow print, it is difficult to see the dot pattern even with a magnifying glass. Thus, printing defects of various types are often not discovered until the last color has been printed. Some examples of such misprinting include undesired "plugging up" or blocking of colors, dragged out dots, double-printed and squeezed-out dots and poor trapping of inks.

Sometimes a large blue filter has been used for direct visual comparison between two yellow sheets, such as a proofsheet and a final press sheet. This involves merely an overall comparison of the two sheets of yellow, for example, and not a close analysis of the dot structure of the printed sheet.

Magnifying devices are known in which a light is provided in combination with a magnifying glass in order to illuminate an object to be inspected. I am not aware, however, of any use or adaptability of such illuminated magnifying glasses for color analysis in the printing field, in combination with any colored filter material positioned in the field of view between the magnifying glass and a color print surface to be inspected, for close analysis of at least one color pattern on such surface.

SUMMARY OF THE INVENTION

The present invention is accordingly designed to provide an optical color printing analysis device having a body portion which can be manually and removably positioned above a printed surface to be inspected, with a magnifying lens unit suitably mounted on the body portion, in combination with means for selectively positioning a suitable color filter in the field of view between the lens unit and the surface to be inspected. At least one such color filter is mounted on a filter support which in turn is movably mounted on the body portion, with a manually operable projecting knob or operating portion for selective movement of the desired filter into and out of the field of view. In the preferred embodiment of the invention, such a filter plate is provided with four circumferentially spaced areas, one of which is a clear area and the others of which are provided with red, green and blue filter areas, for selective rotation of the filter plate to place any desired area into the field of view. The preferred device also includes lighting means on the body for illuminating the surface with white light which includes red, green and blue color components. The method of the invention includes the inspection of colored halftone sheets with such a device by positioning one of the filters in the field of view, such filter being complementary in color to the color of the particular halftone pattern to be analyzed.

BRIEF DESCRIPTION OF THE DRAWING

In the drawings, in which like reference characters designate like parts,

FIG. 1 is a side elevation of a preferred embodiment of the invention.

FIG. 2 is a top plan view of the embodiment of FIG. 1.

FIG. 3 is a side elevation view of another embodiment of the invention.

FIG. 4 is a partial view, similar to FIG. 2, but illustrating the magnified dot pattern and other details as seen through different areas of the filter plate like that of FIG. 3.

DESCRIPTION OF PREFERRED EMBODIMENT

As shown in FIG. 1, a preferred embodiment of the invention includes a body portion indicated generally at 10. This body portion is shaped to provide an elongated handle section 12, one surface 14 of which is essentially flat to provide suitable support means for removably positioning the device on a surface 16 to be inspected. Handle section 12 is preferably shaped for convenient holding by one hand of a user, for manual positioning of the device at different desired locations on such a surface 16. This surface 16, for example, may be the surface of a printed sheet on which a color print or separation appears in the form of the usual halftone dot pattern.

At one end of the handle section 12, the body portion has an extension 18 adapted to support a magnifying lens unit. For this purpose the extension 18 is provided with a threaded opening 20 to receive the threaded tubular body section 22 of magnifying lens unit 24. Such magnifying lens units are well known and may include a threaded adjusting portion 26 which may be moved vertically toward or away from the surface to be inspected by rotation of a knurled operating portion 28. Such rotation moves at least one lens member the magnifying unit such as lens 30, toward or away from the surface to achieve the desired sharpness of focus. The knurled locking nut 32 holds the magnifying unit in its adjusted focused position to prevent inadvertent movement out of adjustment. The term "magnifying lens" is intended to include any lens unit which provides a desired degree of magnification, whether such unit is strictly classified as a magnifier or as a microscope. The degree of magnification is preferably of the order of 20, for fine dot color halftone sheets, but may vary depending on the size of the screenlines for the color to be analyzed. For example, a 10-power magnification may suffice for normal screens of 133 to 150 lines per centimeter, while more than 20-power magnification may be needed for fine screenlines such as 300 lines per centimeter. Thus, different removable magnifying lens units or heads 24 may be supplied with such a device for convenient selection of the optimum magnification for each use.

According to one aspect of the invention, a lighting means in the form of a light bulb 34 is mounted on the body portion 10 by a suitable socket 36 in the body portion. The socket is located and oriented to direct the field of illumination of bulb 34 directly at that portion of the surface 16 which lies in the field of view of the magnifying lens unit. The location of the bulb 34, however, is outside the field of view of the magnifying lens. The lighting means should preferably provide a substantially white light and must at least include some color components corresponding to each of the colors to be inspected and each of the filter colors to be used for such inspection according to the invention.

To provide a current source for the light bulb 34, the handle section 12 of the body portion 10 is recessed at 38 to hold one or more suitable batteries, such as the penlight-type batteries 40 and 42. These batteries may be held in position within recess 38 by appropriate spring contact arms 44 and 46 on a contact member 48 secured to a removable closure plate 50 at one end of the handle section. Closure plate 50 is designed for removable engagement with the handle section 12 and may be retained in assembled position by any suitable means such as the spring latch 52 on the closure 50 which engages a suitable latching recess 54 in the body portion. Batteries of the rechargeable type are particularly advantageous.

Spring arms 44 and 46 of the resilient contact member 48 not only retain the two battery sections in position, but also provide an electrical connection between the base end 56 of battery 40 and the central contact 58 at what would be the opposite effective end of battery 42. Thus, the batteries 40 and 42 are connected in series at this point in known manner.

The circuit from the batteries to the light socket 36 is completed through a suitable contact switch 60. Switch 60 is illustrated as a resilient contact arm mounted on the exterior of the handle section 12 at a location where it may be operated by a portion of the operator's hand when the operator is holding the handle section and magnifying device in operative position on the surface to be inspected.

Thus, switch arm 60 is connected by a wire 62 to a terminal 63 which is engaged by the central contact 64 of battery 40. The remaining terminal 66 of the switch is connected by wire 68 to the center contact 70 of the light bulb socket 36. The body portion of the socket is connected in turn through a wire 72 to a contact 74 located to engage the base end 75 of battery 42. Manual operation of switch arm 60 to engage it with contact 66 will accordingly complete the circuit and cause the bulb 34 to be illuminated. This light bulb provides a relatively intense white light in the preferred form of the invention, i.e., a light which not only includes all of the normal components such as red, blue and green, but which also has sufficient intensity to fully illuminate the surface to be inspected, even when such inspection is made "on the job" in a shaded or indirectly lighted pressroom area.

According to a major feature of the present invention, means are provided for selectively positioning one or more color filters within the field of view of magnifying lens unit and between that unit and the surface to be inspected. The color filter will not, however, be interposed between the light source and the surface to be inspected.

Such a filter-positioning means is illustrated generally at 76 and includes a filter support 78 which is shown in this embodiment as a substantially circular plate member. Circumferentially spaced around the plate member 78 are a plurality of areas 80, 82, 84 and 86. In this embodiment, area 80 is a clear area, i.e., one which transmits the complete spectrum of light from the surface to be inspected. Thus, if the surface is inspected under white light, the entire spectrum of colors will be visible through area 80 and the magnifying lens 30. Areas 82, 84 and 96 are respectively provided with red, green and blue filters, as illustrated particularly in FIG. 2.

The filter support plate 78 is mounted within a recess or slot 88 in the handle section 12 of the body portion 10. In this case, the filter plate 78 is mounted for rotary movement on an axis extending generally perpendicular to the filter plate itself and to the plane of the surface 16 to be inspected. A screw member 90 having its head 92 accessible at the top of the body portion 10 provides the pivotal support for plate 78. Thus, rotation of the filter plate 78 on the axis of screw 90 can move the plate selectively from a first position, as illustrated in FIG. 2, wherein the clear area 80 is in the field of view of the magnifying lens, to a second position in which the blue filter 86 is in alignment with the lens, and selectively to respective third and fourth positions in which the green and red filters are brought into position as desired.

When the device of this invention is to be used for close examination of the dot pattern in a yellow printed halftone sheet, for example, the plate 78 will be moved from its first or clear position to its second position so that blue filter 86 is in the field of view of the magnifying lens. As illustrated in FIG. 4, where the filter unit is shown in an intermediate position to emphasize the different viewing effects through clear area 80 and blue area 86, I have found the the practical effect of using such a blue filter for inspection of the yellow dot pattern is that the yellow dots themselves can be clearly seen as darker magnified images at 108, as compared to the relatively light magnified yellow dot images viewed at 106 through the clear area 80 with no color filter. Thus, filter 86 makes it possible to single out such a yellow dot pattern and study the magnified dark images of the yellow dots to determine whether there are misprinting problems requiring correction. This singling out of one desired color dot pattern can even be effective in cases where a differently colored halftone dot pattern, i.e., in another printing color, may have been printed over some portions of the colored dots which one desires to analyze.

As a further example, it is possible to analyze a sheet printed with more than two colors, such as the three subtractive colors used in a subtractive color printing process, and single out, by selective positioning of the appropriate complementary colored filter, a darker contrast magnified image of only the dot pattern of one subtractive color, even though it may be overlapped in whole or in part by portions of one or both of the dot patterns of the other two subtractive colors.

The three printing color ordinarily used in a basic form of such a subtractive color process are yellow, magenta and cyan. The yellow color transmits red and green light components, but not blue, and is sometimes characterized as "-minus blue." The magenta transmits red and blue, but not green, and can be thought of as "minus green." Similarly, the cyan transmits blue and green, but not red, and may be called "minus red." Since the yellow color does not, for example, reflect or transmit any blue light and is characterized by the absence of blue, there will be no effective light to come through the blue filter from the yellow areas. Thus, these yellow areas will appear dark at 108 (FIG. 4) when looked at through the magnifying lens and blue filter 86. In contrast, the areas adjacent the yellow dots, i.e., the white or unprinted areas, as well as any dots printed in colors other than yellow, immediately adjacent such dots, can reflect blue light as well as other colors. Thus, these areas do reflect light through the blue filter and will appear extremely light in clear contrast to the dark appearance of the yellow dot pattern as viewed through the blue filter. When viewed through the clear area 80, however, the yellow dots reflect red and green light through the lens and thus have only slight contrast as compared to the unprinted adjacent areas at 106. Misprinting details, such as blocking of colors are more readily visible, as at 108, through the combined magnifying and filtering action according to the invention.

There are, of course, differences in color printing processes, and the present invention is capable of use with other filter colors and other printing color arrangements. The difficulty of viewing the individual dot patterns in a subtractive color process, however, makes the invention particularly useful when complementary filters for each of those printing colors are mounted on a manually portable analysis device for selective movement into and out of the field of view of the magnifying lens of such a device.

To insure adequate inspection of the desired color printed dot pattern, it is possible for the magnifying lens unit to have not only a substantial magnification factor, but also some sort of associated measuring means. One such means is shown in FIG. 4 as an internal scale, the image of which can be seen at 110, when the user looks through the magnifying lens unit, for better analysis of the size of the dots in such a printing pattern.

Another embodiment of the invention is shown in FIG. 3. In this embodiment, a filter support plate 94 is provided with a single filter area 96 for an appropriate color filter, preferably a blue filter. The handle section 12 of body portion 10 is provided with a longitudinal slot 98 adapted to support the filter plate 94 for longitudinal movement back and forth in the handle. An operating projection 100 on the filter support 94 projects laterally from the handle section 12 at a location conveniently accessible to the thumb or finger of an operator who is holding the handle section in position on an area to be inspected, such as the surface 16. When the projection 100 and support plate 94 are in the solid line position at the left in FIG. 3, the filter area 96 is in alignment with the viewing axis or field of view of the magnifying lens unit 24.

When the operator moves the projecting portion 100 longitudinally back along the handle to the dotted line position illustrated at 102, the filter support plate 94 and its filter area 96 will be retracted out of the field of view of the magnifying lens unit. Thus, the filter area in this case is selectively movable between two positions, i.e., a first position (dotted, at the right of FIG. 3) in which the color filter is outside the field of view of the magnifying unit, and a second position (solid line position at the left of FIG. 3) in which the color filter is in the field of view. Suitable interfitting guide means on the support plate 94 and handle section 12, for example the edges of slot 98, provide the desired guidance for plate 94 as it moves from one position to the other at the selection of the user. A manually portable unit of this type with a single blue filter, for example, is useful in situations where most of the problems of printing or inspection involve a yellow printing color.

From this description it will be apparent that an optical color printing analysis device and method have been provided which can be extremely useful in the immediate examination of halftone color sheets or other color printed surfaces, either as they are produced in a press room or otherwise. In the foregoing specification I have accordingly described the background and nature of my invention, and some of the ways in which it may be practical.

Now, therefore, I claim:

1. An optical color printing analysis device for analyzing color dot pattern comprising a body portion having support means for removably positioning the body above a color dot pattern to be inspected, a magnifying lens unit mounted on said body portion and having a field of view directed toward and focusable on said color dot pattern, a plurality of optical filters each passing a preselected band of color, color filter support means on said device for selectively positioning one of said filters of a color complementary to a component color of the color dot pattern being analyzed in said field of view between said unit and the surface to be inspected, and means providing for direct illumination below the filter of the surface to be inspected by a source of light comprising several color components including that of the color dot pattern to be analyzed.

2. A color printing analysis device according to claim 1 in which said color filter support means includes a filter support member movably mounted on said body portion for movement between a plurality of positions in which different ones of said filters are positioned in said field of view.

3. A color printing analysis device according to claim 2 in which said body portion has a slot extending generally parallel to the plane of the surface to be inspected, said filter support member being mounted in said slot and having a manually accessible operating portion projecting laterally from said slot.

4. A color printing analysis device according to claim 3 in which said filter support is slidably mounted in said slot.

5. A color printing analysis device according to claim 1 in which said illuminating means include lighting means mounted on said body portion and having a field of illumination directed toward such surface.

6. A colored printing analysis device according to claim 5 in which said lighting means provides a generally white light and one of said filters is a blue filter.

7. A color printing analysis device according to claim 5 in which said lighting means provides a generally white light including red, green and blue components, said device having a clear area and separate red, green and blue filters on said filter support, and said filter support being selectively movable to a first position in which the clear area is in said field of view and second, third and fourth positions in each of which a different one of said red, green and blue filters is positioned in said field of view.

8. A color printing analysis device according to claim 5 in which said lighting means provides a generally white light including red, green and blue components, said filter support comprising a circular plate member mounted for rotary movement about an axis passing through the center of the plate generally perpendicular to both the plate and to the plane of the flat surface of the handle section, said filter support having said clear area and separate red, green and blue filter areas all spaced circumferentially around said axis of rotary movement for selective alignment of any of said clear and filter areas with said field of view.

9. A color printing analysis device according to claim 2 in which said filter support member comprises a plate member mounted for rotary movement about an axis generally perpendicular to the surface to be inspected, at least a portion of the plate member projecting laterally beyond said body portion for convenient manual actuation from one position to another.

10. A color printing analysis device according to claim 9 in which said body portion has an elongated handle section shaped for convenient holding in an operator's hand, said handle section having a generally flat longitudinally extending surface constituting the support means for positioning the body on the surface to be inspected, said filter plate portion projecting laterally beyond the body portion at a location conveniently accessible for operation by a portion of an operator's hand, said body portion including electrical energizing means therein, manually operable switch means connected between energizing means and light source for selective energization of said source, said switch means being mounted on the body portion at a location conveniently accessible for operation by a portion of the operator's hand, and said magnifying lens unit being mounted at one end of said body portion beyond the area of the handle section which is normally grasped by an operator.

11. A color printing analysis device according to claim 2 having means for manual focusing adjustment of said lens unit, and said lens unit including an internal scale for visual measurement of portions of the surface to be inspected.

12. A method of analyzing a colored halftone sheet having a colored dot pattern thereon with a manually portable analysis device having a magnifying lens unit and a plurality of selectively positionable optical filters each passing a preselected band of color, said method comprising positioning the analysis device on the colored dot pattern of the halftone sheet with the lens unit above the sheet and having a field of view directed toward the sheet and focused on the dot pattern thereon, illuminating said sheet and dot pattern directly with a light which includes components corresponding to each of said dot and filter colors, selectively positioning, in the field of view between the lens unit and sheet, a color filter of a color complementary to the color dot pattern being analyzed, and viewing the sheet through said lens unit and complementary color filter, thereby providing an enlarged, dark contrast image of the colored dot pattern as seen through said device.

13. A method according to claim 12 in which said halftone sheet is a multicolored halftone sheet having a plurality of differently colored dot patterns thereon, some of the dots of one color being printed over portions of dots of another color, the respective optical filters having colors complementary to respective dot pattern colors, said method comprising selectively positioning one color filter at a time between the illuminated dot pattern and the lens unit, thereby providing an enlarged dark contrast image of the specific color dot pattern for which that one color filter is complementary.

14. A method according to claim 13 in which the halftone sheet comprises three differently colored dot patterns printed in three different subtractive colors with some of the dots of one subtractive color being printed over portions of dots of a second subtractive color and with some of said dot portions of the second subtractive color printed over areas of dots of a third subtractive color, said method comprising illuminating said sheet and dot patterns with a generally white light which includes color components corresponding to all of said dot and filter colors, the selective positioning of a particular color filter providing an enlarged dark contrast complete image of only that subtractive color dot pattern for which that particular filter color is complementary.

* * * * *